US011111353B2

United States Patent
Tseng et al.

(10) Patent No.: US 11,111,353 B2
(45) Date of Patent: Sep. 7, 2021

(54) POROUS-OBJECT PRODUCTION METHOD

(71) Applicant: DIC Corporation, Tokyo (JP)

(72) Inventors: Yayi Tseng, Osaka (JP); Kunihiko Komatsuzaki, Osaka (JP)

(73) Assignee: DIC CORPORATION, Tokyo (JP)

( * ) Notice: Subject to any disclaimer, the term of this patent is extended or adjusted under 35 U.S.C. 154(b) by 63 days.

(21) Appl. No.: 16/635,695

(22) PCT Filed: Jun. 19, 2018

(86) PCT No.: PCT/JP2018/023234
§ 371 (c)(1),
(2) Date: Jan. 31, 2020

(87) PCT Pub. No.: WO2019/026446
PCT Pub. Date: Feb. 7, 2019

(65) Prior Publication Data
US 2021/0130566 A1 May 6, 2021

(30) Foreign Application Priority Data

Aug. 3, 2017 (JP) .............................. JP2017-150680

(51) Int. Cl.
*C08J 9/28* (2006.01)
*C08G 18/08* (2006.01)
(52) U.S. Cl.
CPC ......... *C08J 9/28* (2013.01); *C08J 2201/0502* (2013.01); *C08J 2375/04* (2013.01)
(58) Field of Classification Search
CPC .. C08J 9/28; C08J 2201/0502; C08J 2375/04; C08G 18/6674; C08G 2110/0033;
(Continued)

(56) References Cited

U.S. PATENT DOCUMENTS

2006/0052040 A1* 3/2006 Prasad ................ B24D 11/001
451/41

FOREIGN PATENT DOCUMENTS

EP 2436724 A1 4/2012
JP H07-053764 A 2/1995
(Continued)

OTHER PUBLICATIONS

"The HSP Sphere, Hansen Solubility Parameters." hansen-solubility. com. (Year: 2021).*

(Continued)

*Primary Examiner* — Kara B Boyle
(74) *Attorney, Agent, or Firm* — McDermott Will & Emery LLP

(57) ABSTRACT

A method for producing a porous material includes processing a urethane resin composition containing a urethane resin (A) and a solvent (B) by a wet film forming process, in which the solvent (B) satisfies the following conditions: a difference between a Hansen solubility parameter of the solvent (B) (B-HSP) and a Hansen solubility parameter of the urethane resin (A) (A-HSP) is in the range of 3 to 8 $(J/cm^3)^{1/2}$ and a difference between the Hansen solubility parameter of the solvent (B) (B-HSP) and a Hansen solubility parameter of water (W-HSP) is in the range of 31.5 to 38 $(J/cm^3)^{1/2}$. The Hansen solubility parameter of the solvent (B) preferably has a dispersion term ($\delta D$) in the range of 15.5 to 21.0 $MPa^{0.5}$, a polar term ($\delta P$) in the range of 7.0 to 14.5 $MPa^{0.5}$, and a hydrogen bond term ($\delta H$) in the range of 4.5 to 11.0 $MPa^{0.5}$.

4 Claims, 1 Drawing Sheet

(58) Field of Classification Search
CPC .......... C08G 2101/00; C08G 18/4854; C08G 18/0852; C08G 18/664; C08G 18/3206; C08G 18/42; C08G 18/7671; C08G 2201/0544
See application file for complete search history.

(56) References Cited

FOREIGN PATENT DOCUMENTS

| | | | |
|---|---|---|---|
| JP | 2005-238597 A | | 9/2005 |
| JP | 2005238597 | * | 9/2005 |
| JP | 2009-514690 A | | 4/2009 |
| JP | 2011-073112 | * | 4/2011 |
| JP | 2011-73112 A | | 4/2011 |
| WO | 2007/055901 A1 | | 5/2007 |
| WO | 2015033732 A1 | | 3/2015 |

OTHER PUBLICATIONS

Extended European Search Report issued in corresponding European Patent Application No. 18840147.5, dated Mar. 30, 2021.
International Search Report issued in International Application No. PCT/JP2018/023234, dated Sep. 18, 2018, with English translation.

* cited by examiner

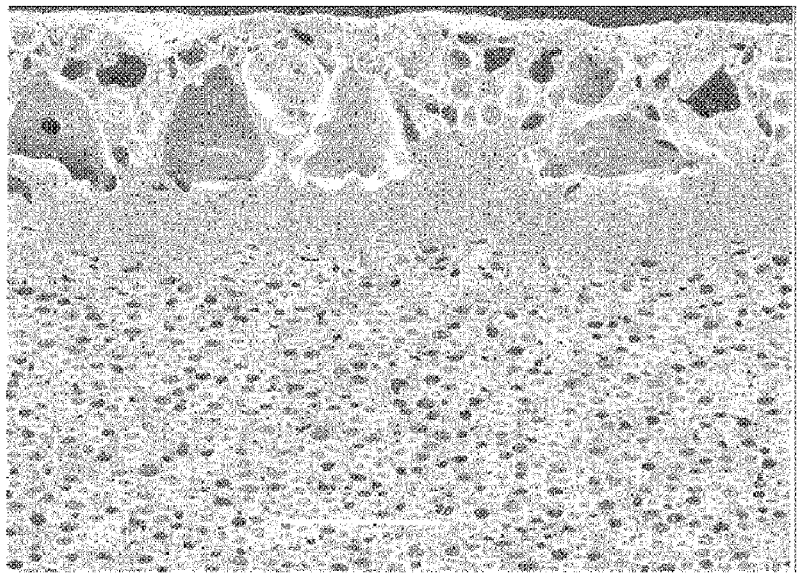

POROUS-OBJECT PRODUCTION METHOD

CROSS REFERENCE

This patent application is the U.S. National Phase under 35 U.S.C. § 371 of International Application No. PCT/JP2018/023234, filed on Jun. 19, 2018, which claims the benefit of Japanese Patent Application No. 2017-150680, filed on Aug. 3, 2017, the entire contents of each are hereby incorporated by reference.

TECHNICAL FIELD

The present invention relates to a porous material produced through processing by a wet film forming process.

BACKGROUND ART

Urethane resins have characteristics, such as softness and toughness, as well as a good texture, and thus are widely used in production of artificial leather and synthetic leather. When a urethane resin is used particularly in artificial leather and synthetic leather, an intermediate layer is often formed with the urethane resin for imparting a texture and voluminous feeling.

A urethane resin used in the intermediate layer is generally in the form of a resin solution in N,N-dimethylformamide (hereinafter abbreviated as "DMF") which is excellent in solubility of urethane resins, and the urethane resin solution is applied on a substrate and the substrate is immersed in water to thereby form a porous intermediate layer by a substitution action of the resin solution with water (see, for example, PTL 1).

However, DMF might cause an allergic reaction or dermatitis and is listed as a substance of very high concern in Europe and restriction of its use in the future is becoming realistic. The fact is however that, since DMF which is excellent in compatibility with urethane resins and water has been used as an essential solvent in the wet film formation, the substitution has not been advanced as far as the demand from the industry.

CITATION LIST

Patent Literature

PTL 1: JP-A-7-53764

SUMMARY OF INVENTION

Technical Problem

The problem that the present invention is to solve is to provide a method for producing a porous material by a wet film forming process without using DMF.

Solution to Problem

The present invention provides a method for producing a porous material, the method including processing a urethane resin composition containing a urethane resin (A) and a solvent (B) by a wet film forming process, in which the solvent (B) satisfies the following conditions: a difference between a Hansen solubility parameter of the solvent (B) (B-HSP) and a Hansen solubility parameter of the urethane resin (A) (A-HSP) is in the range of 3 to 8 $(J/cm^3)^{1/2}$ and a difference between the Hansen solubility parameter of the solvent (B) (B-HSP) and a Hansen solubility parameter of water (W-HSP) is in the range of 31.5 to 38 $(J/cm^3)^{1/2}$.

Advantageous Effects of Invention

According to the present invention, a porous material can be produced by a wet film forming process without using DMF. Thus, the present invention can be particularly suitably used for production of artificial leather or synthetic leather in which the use restriction of DMF is to be tight in the future. Note that, in the present invention, the "porous material" refers to a material that has so many pores that will be naturally resulted when a urethane resin composition is solidified by a wet film forming process, for example, a material having formed therein a porous structure in a fusiform or a teardrop form that is long in the thickness direction of its surface.

BRIEF DESCRIPTION OF DRAWINGS

FIG. 1 It shows an electron micrograph of a cross-section of a porous material obtained in Example 1 (magnification: ×500).

DESCRIPTION OF EMBODIMENTS

The present invention relates to a method for producing a porous material, the method including processing a urethane resin composition containing a urethane resin (A) and a solvent (B) by a wet film forming process, and it is an essential requirement that the solvent (B) is a specific solvent.

In the present invention, the following is an essential requirement: as the solvent (B), a solvent satisfying the following condition: the difference between the Hansen solubility parameter of the solvent (B) (B-HSP) and the Hansen solubility parameter of the urethane resin (A) (A-HSP) is in the range of 3 to 8 $(J/cm^3)^{1/2}$ and the difference between the Hansen solubility parameter of the solvent (B) (B-HSP) and the Hansen solubility parameter of water (W-HSP) is in the range of 31.5 to 38 $(J/cm^3)^{1/2}$ is used. In the present invention, by using such a solvent (B) that satisfies the above ranges, the urethane resin (A) and the solvent (B) are soluble in each other to stably be in the form of a resin solution and a porous material can be produced by a wet film forming process.

Note that the Hansen solubility parameter is based on an idea that two substances exhibiting a similar intermolecular interaction are easily dissolved in each other and specifically, a solubility parameter introduced by Hildebrand is divided into three components: a dispersion term ($\delta D$), a polar term ($\delta P$), and a hydrogen bond term ($\delta H$), and is then expressed in a three-dimensional space. The dispersion term ($\delta D$) represents the effect of a dispersion force, the polar term ($\delta P$) represents the effect of a dipole-dipole force, and a hydrogen bond term ($\delta H$) represents the effect of a hydrogen bonding force.

Note that the definition and computation of the Hansen solubility parameter are described in Charles M. Hansen "Hansen Solubility Parameters; A Users Handbook (CRC Press, 2007)". In addition, by using a computer software "Hansen Solubility Parameters in Practice (HSPiP)", a Hansen solubility parameter of a solvent whose parameter value is not shown in any document can be estimated based on the chemical structure of the solvent. In the present invention, for a solvent whose parameter value is found in a document, the value is used, and for a solvent whose parameter value is not found in any document, a parameter value estimated using the HSPiP version 4.1.06 is used. The difference (absolute value) between the Hansen solubility parameter of the solvent (B) (B-HSP) and the Hansen solubility parameter of the urethane resin (A) (A-HSP) and the difference (absolute value) between the Hansen solubility parameter of the solvent (B) (B-HSP) and the Hansen solubility parameter of water (W-HSP) are calculated based on the above-mentioned values.

As the solvent (B), one solvent can be used or two or more solvents can be used in combination. When two or more solvents are used in combination, solvents can be used in such a combination that values obtained by calculating a weighted average of the parameters of the solvents for each of the three parameters of the Hansen solubility parameter satisfy the above ranges.

As the solvent (B), from the viewpoint of being capable of forming better pores, the dispersion term ($\delta D$) of the Hansen solubility parameter is preferably in the range of 15.5 to 21 $MPa^{0.5}$ and more preferably in the range of 16.0 to 20 $MPa^{0.5}$. In addition, for the same reason, the dispersion term ($\delta P$) is preferably in the range of 7 to 14.5 $MPa^{0.5}$ and more preferably in the range of 8 to 13.5 $J1/2$ $MPa^{0.5}$. Furthermore, for the same reason, the dispersion term ($\delta H$) is preferably in the range of 4.5 to 11 $MPa^{0.5}$ and more preferably in the range of 5 to 10 $MPa^{0.5}$.

Specific examples of the solvents (B) include N,N,2-trimethylpropionamide (Hansen solubility parameter: 20.14, dispersion term ($\delta D$): 16.7, polar term ($\delta P$): 9.2, hydrogen bond term ($\delta H$): 6.5), N,N-dimethylacrylamide (Hansen solubility parameter: 21.81, dispersion term ($\delta D$): 17.3, polar term ($\delta P$): 10.6, hydrogen bond term ($\delta H$): 8.0), N,N-dimethylpropionamide (Hansen solubility parameter: 21.28, dispersion term ($\delta D$): 16.4, polar term ($\delta P$): 11.3, hydrogen bond term ($\delta H$): 7.5), N,N-diethylacetamide (Hansen solubility parameter: 22.42, dispersion term ($\delta D$): 16.8, polar term ($\delta P$): 11.5, hydrogen bond term ($\delta H$): 9.4), N,N-diethylacrylamide (Hansen solubility parameter: 19.65, dispersion term ($\delta D$): 16.9, polar term ($\delta P$): 9.2, hydrogen bond term ($\delta H$): 4.0), 1,3-dimethyl-2-imidazolidinone (Hansen solubility parameter: 22.29, dispersion term ($\delta D$): 18.2, polar term ($\delta P$): 10.0, hydrogen bond term ($\delta H$): 8.1), N-ethylpyrrolidone (Hansen solubility parameter: 22.74, dispersion term ($\delta D$): 18.0, polar term ($\delta P$): 12.0, hydrogen bond term ($\delta H$): 7.0), and 2-pyrrolidone (Hansen solubility parameter: 23.58, dispersion term ($\delta D$): 18.2, polar term ($\delta P$): 12.0, hydrogen bond term ($\delta H$): 9.0).

As the solvent (B), regardless of the type of the urethane resin (A), in terms of being capable of further stably forming a porous structure, N,N,2-trimethylpropionamide and/or N,N-dimethylacrylamide is preferably used.

In terms of solubility of the urethane resin (A), the content of the solvent (B) is preferably in the range of 10 to 90% by mass in the urethane resin composition, and more preferably in the range of 20 to 80% by mass.

As the urethane resin (A) used in the present invention, a reaction product of a polyol (a1) and a polyisocyanate (a2) can be used.

As the polyol (a1), for example, a polyester polyol, a polyether polyol, or a polycarbonate polyol can be used. The polyols may be used alone or may be used in combination of two or more thereof. Note that in the field of production of a porous material, as the polyol (a1), a polyester polyol, a polyether polyol (except for polyethylene glycol), and a polycarbonate polyol are most generally used. It is known that, among the polyols, a polyester polyol which has an appropriate hydrophilicity most easily produce a porous material, and a polycarbonate polyol follows it, and a polyether polyol which is hydrophobic (except for polyethylene glycol) is most difficult to form pores. However, in the present invention, by using the specific solvent (B), a porous material can be easily produced through a wet film forming process by using whatever polyol of them.

In terms of the mechanical properties and softness of the porous material, the number average molecular weight of the polyol (a1) is preferably in the range of 500 to 10,000 and more preferably in the range of 700 to 8,000. Note that the number average molecular weight of the polyol (a1) refers to a value measured by gel permeation chromatography (GPC).

With the polyol (a1), a chain extender (a1-1) having a number average molecular weight less than 500 can be used together as required. As the chain extender (a1-1), for example, a chain extender having a hydroxy group or a chain extender having an amino group can be used. The chain extenders (a1-1) may be used alone or may be used in combination of two or more thereof.

As the chain extender having a hydroxy group, for example, an aliphatic polyol compound, such as ethylene glycol, diethylene glycol, triethylene glycol, propylene glycol, 1,3-propanediol, 1,3-butanediol, 1,4-butanediol, hexamethylene glycol, saccharose, methylene glycol, glycerol, or sorbitol; an aromatic polyol compound, such as bisphenol A, 4,4'-dihydroxydiphenyl, 4,4'-dihydroxydiphenyl ether, 4,4'-dihydroxydiphenyl sulfone, hydrogenated bisphenol A, or hydroquinone; or water can be used. The chain extenders may be used alone or may be used in combination of two or more thereof.

As the chain extender having an amino group, for example, ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethyl ethanolamine, hydrazine, diethylenetriamine, or triethylenetetramine can be used. The chain extenders may be used alone or may be used in combination of two or more thereof.

As the polyisocyanate (a2), for example, an aromatic polyisocyanate, such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, triene diisocyanate, naphthalene diisocyanate, xylylene diisocyanate, or tetramethylxylylene diisocyanate; an aliphatic polyisocyanate, such as hexamethylene diisocyanate or lysine diisocyanate; or an alicyclic polyisocyanate, such as cyclohexane diisocyanate, hydrogenated xylylene diisocyanate, isophorone diisocyanate, or dicyclohexylmethane diisocyanate can be used. The polyisocyanates may be used alone or may be used in combination of two or more thereof.

An example of a method for producing the urethane resin (A) is a method in which the polyol (a1), the polyisocyanate (a2), and, as required, the chain extender (a1-1) are mixed and reacted to produce the urethane resin (A). The reaction is preferably performed at a temperature of 50 to 100° C. for approximately 3 to 10 hours. In addition, the reaction may be performed in the solvent (B) described later.

The ratio by mole of the isocyanate groups in the polyisocyanate (a2) to the sum total of the hydrogen groups in the polyol (a1) and the hydroxy groups and the amino groups in the chain extender (a1-1) [(isocyanate group)/(hydroxy group and amino group)] is preferably in the range of 0.8 to 1.2 and more preferably in the range of 0.9 to 1.1.

In terms of the mechanical strength and softness of the porous material, the weight average molecular weight of the urethane resin (A) obtained by the above method is preferably in the range of 5,000 to 500,000, more preferably in the range of 10,000 to 300,000, and further preferably in the range of 30,000 to 150,000. Note that the weight average molecular weight of the urethane resin (A) refers to a value obtained by measuring in the same manner as for the number average molecular weight of the polyol (a1).

The urethane resin composition contains the urethane resin (A) and the solvent (B) as essential components, and may contain another additive as required.

As the other additive, for example, a pigment, a flame retardant, a plasticizer, a softening agent, a stabilizer, a wax, an antifoaming agent, a dispersant, a penetrant, a surfactant, a filler, an antifungal agent, an antimicrobial agent, an ultraviolet absorber, an antioxidant, a weathering stabilizer, a fluorescent brightening agent, an aging inhibitor, or a thickening agent can be used. The additives may be used alone or may be used in combination of two or more thereof.

Next, the method for producing a porous material by subjecting the urethane resin composition to a wet film forming process will be described.

The wet film forming process is a method in which a surface of a substrate is coated or impregnated with the urethane resin composition and the coated or impregnated surface is brought into contact with water, water vapor, or the like to thereby solidify the urethane resin (A) and produce a porous material.

As the substrate on which the urethane resin composition is applied, for example, a substrate formed of a nonwoven fabric, a woven fabric, or a knitted fabric; or a resin film can be used. As a material forming the substrate, for example, a chemical fiber, such as a polyester fiber, a nylon fiber, an acrylic fiber, a polyurethane fiber, an acetate fiber, a rayon fiber, or a polylactic acid fiber; cotton, hemp, silk, wool, or a mixed spun fiber thereof can be used.

The surface of the substrate may be previously subjected to a treatment, such as an antistatic processing, a mold release processing, a water repellent processing, a water absorption processing, an antimicrobial and deodorant processing, a bacteriostatic processing, or an ultraviolet screening processing as required.

Examples of methods for coating or impregnating the substrate surface with the urethane resin composition include a gravure coating method, a knife coating method, a pipe coating method, and a comma coating method. In the method, for controlling the viscosity of the urethane resin composition to enhance the workability of coating, the amount of the organic solvent (B) used may be adjusted as required.

The thickness of the coating film of the urethane resin composition obtained by coating or impregnation by the method is preferably in the range of 0.5 to 5 mm and more preferably in the range of 0.5 to 3 mm.

Examples of methods for bringing the coating surface formed by coating or impregnation with the urethane resin composition into contact with water or water vapor include a method of immersing a substrate provided with a coating layer or impregnated layer formed of the urethane resin composition in a water bath; and a method of spraying water on the coating surface with an atomizer or the like. The immersion is preferably performed in a water bath at 5 to 60° C. for about 2 to 20 minutes.

In the porous material obtained by the method, it is preferred that the surface thereof is washed with water at normal temperature or with hot water to remove the solvent (B) by extraction and then the surface is dried. The washing is preferably performed with water at 5 to 60° C. for about 20 to 120 minutes, and the water used for washing is preferably replaced one or more times or continuously replaced with flowing water. The drying is performed with a drier or the like adjusted at 80 to 120° C. for about 10 to 60 minutes.

As described above, according to the present invention, a porous material can be produced by a wet film forming process without using DMF. Thus, the present invention can be suitably used particularly for producing artificial leather or synthetic leather in which the use restriction of DMF is to be tight in the future. In addition, the present invention can be used for various applications, such as a polishing pad; a polishing back pad; medical hygiene materials, such as a surgical gown and a bed sheet; sheets for building materials, such as a windbreaking and waterproof sheet and a dew condensation preventing sheet; materials for packaging, such as a desiccant, a dehumidification agent, and a fragrant; agricultural sheets, various separators, and packings.

EXAMPLES

The present invention will be described in more detail below with reference to examples.

[Synthetic Example 1] Synthesis of Urethane Resin (A-1)

Into a reactor equipped with a stirrer, a condenser, and a thermometer were put 100 parts by mass of a polyester polyol ("CMA-244" manufactured by DIC Corporation, number average molecular weight; 2,000), 8 parts by mass of ethylene glycol, 250 parts by mass of N,N,2-trimethylpropionamide, and 45 parts by mass of 4,4'-diphenylmethane diisocyanate, then the mixture was reacted at 85° C. under stirring until the viscosity reached 600 dPa·s, and 0.22 parts by mass of methanol was added and reacted to thereby obtain a urethane resin composition containing a urethane resin (A-1).

[Synthetic Example 2] Synthesis of Urethane Resin (A-2)

Into a reactor equipped with a stirrer, a condenser, and a thermometer were put 100 parts by mass of a polyester polyol ("CMA-244" manufactured by DIC Corporation, number average molecular weight; 2,000), 8 parts by mass of ethylene glycol, 250 parts by mass of N,N-dimethylacrylamide, and 45 parts by mass of 4,4'-diphenylmethane diisocyanate, then the mixture was reacted at 85° C. under stirring until the viscosity reached 600 dPa·s, and 0.22 parts by mass of methanol was added and reacted to thereby obtain a urethane resin composition containing a urethane resin (A-2).

[Synthetic Example 3] Synthesis of Urethane Resin (A-3)

Into a reactor equipped with a stirrer, a condenser, and a thermometer were added 100 parts by mass of polytetramethylene glycol (number average molecular weight; 2,000), 8 parts by mass of ethylene glycol, 250 parts by mass of N,N,2-trimethylpropionamide, and 45 parts by mass of 4,4'-diphenylmethane diisocyanate, then the mixture was reacted at 85° C. under stirring until the viscosity reached 600 dPa·s, and 0.22 parts by mass of methanol was added and reacted to thereby obtain a urethane resin composition containing a urethane resin (A-3).

[Synthetic Example 4] Synthesis of Urethane Resin (A-4)

Into a reactor equipped with a stirrer, a condenser, and a thermometer were added 100 parts by mass of polytetramethylene glycol (number average molecular weight; 2,000), 8 parts by mass of ethylene glycol, 250 parts by mass of N,N-dimethylacrylamide, and 45 parts by mass of 4,4'-diphenylmethane diisocyanate, then the mixture was reacted at 85° C. under stirring until the viscosity reached 600 dPa·s, and 0.22 parts by mass of methanol was added and reacted to thereby obtain a urethane resin composition containing a urethane resin (A-4).

[Method for Measuring Number Average Molecular Weight of Polyol]

The number average molecular weight of the polyol used in Synthetic Examples refers to a value measured by gel permeation chromatography (GPC) under the following conditions.

Measurement Apparatus: high speed GPC device ("HLC-8220GPC" manufactured by TOSOH Corporation)
Column: the following columns manufactured by TOSOH Corporation which were connected in series were used.
 "TSK gel G5000" (7.8 mm I.D.×30 cm)×1
 "TSK gel G4000" (7.8 mm I.D.×30 cm)×1
 "TSK gel G3000" (7.8 mm I.D.×30 cm)×1
 "TSK gel G2000" (7.8 mm I.D.×30 cm)×1
Detector: RI (refractive index detector)
Column temperature: 40° C.
Eluent: tetrahydrofuran (THF)
Flow rate: 1.0 mL/min
Injection: 100 µL (a tetrahydrofuran solution of a sample at a concentration of 0.4% by mass)
Standard: the following standard polyethylenes were used to create a calibration curve.
(Standard polystyrenes)
 "TSK gel standard polystyrene A-500" manufactured by TOSOH Corporation
 "TSK gel standard polystyrene A-1000" manufactured by TOSOH Corporation
 "TSK gel standard polystyrene A-2500" manufactured by TOSOH Corporation
 "TSK gel standard polystyrene A-5000" manufactured by TOSOH Corporation
 "TSK gel standard polystyrene F-1" manufactured by TOSOH Corporation
 "TSK gel standard polystyrene F-2" manufactured by TOSOH Corporation
 "TSK gel standard polystyrene F-4" manufactured by TOSOH Corporation
 "TSK gel standard polystyrene F-10" manufactured by TOSOH Corporation
 "TSK gel standard polystyrene F-20" manufactured by TOSOH Corporation
 "TSK gel standard polystyrene F-40" manufactured by TOSOH Corporation
 "TSK gel standard polystyrene F-80" manufactured by TOSOH Corporation
 "TSK gel standard polystyrene F-128" manufactured by TOSOH Corporation
 "TSK gel standard polystyrene F-288" manufactured by TOSOH Corporation
 "TSK gel standard polystyrene F-550" manufactured by TOSOH Corporation Example 1

100 parts by mass of the urethane resin composition obtained in Synthetic Example 1 was further diluted with 30 parts by mass of N,N,2-trimethylpropionamide, and the solution was applied on a polyethylene terephthalate (PET) film into a thickness (wet) of 1 mm. Subsequently, the coated substrate was immersed in a bath for solidification (water at 25° C.) for 10 minutes to solidify the urethane resin (A-1). Then, the substrate was immersed in water at 50° C. for 60 minutes to wash the solvent. After washing, the substrate was dried with hot air at 120° C. for 30 minutes to obtain a porous material.

Example 2

100 parts by mass of the urethane resin composition obtained in Synthetic Example 2 was further diluted with 30 parts by mass of N,N-dimethylacrylamide, and the solution was applied on a polyethylene terephthalate (PET) film into a thickness (wet) of 1 mm. Subsequently, the coated substrate was immersed in a bath for solidification (water at 25° C.) for 10 minutes to solidify the urethane resin (A-2). Then, the substrate was immersed in water at 50° C. for 60 minutes to wash the solvent. After washing, the substrate was dried with hot air at 120° C. for 30 minutes to obtain a porous material.

Example 3

100 parts by mass of the urethane resin composition obtained in Synthetic Example 3 was further diluted with 30 parts by mass of N,N,2-trimethylpropionamide, and the solution was applied on a polyethylene terephthalate (PET) film into a thickness (wet) of 1 mm. Subsequently, the coated substrate was immersed in a bath for solidification (water at 25° C.) for 10 minutes to solidify the urethane resin (A-3). Then, the substrate was immersed in water at 50° C. for 60 minutes to wash the solvent. After washing, the substrate was dried with hot air at 120° C. for 30 minutes to obtain a porous material.

Example 4

100 parts by mass of the urethane resin composition obtained in Synthetic Example 4 was further diluted with 30 parts by mass of N,N-dimethylacrylamide, and the solution was applied on a polyethylene terephthalate (PET) film into a thickness (wet) of 1 mm. Subsequently, the coated substrate was immersed in a bath for solidification (water at 25° C.) for 10 minutes to solidify the urethane resin (A-4). Then, the substrate was immersed in water at 50° C. for 60 minutes to wash the solvent. After washing, the substrate was dried with hot air at 120° C. for 30 minutes to obtain a porous material.

[Comparative Example 1] Synthesis of Urethane Resin (A'-1)

Into a reactor equipped with a stirrer, a condenser, and a thermometer were added 100 parts by mass of a polyester polyol ("CMA-244" manufactured by DIC Corporation, number average molecular weight; 2,000), 8 parts by mass of ethylene glycol, 250 parts by mass of γ-butyrolactone, and 45 parts by mass of 4,4'-diphenylmethane diisocyanate, and reaction of the mixture was attempted at 85° C. but the mixture gelled partway through.

[Method of Checking Porous Material]

The porous bodies obtained in Examples were observed using a scanning electron microscope "SU3500" manufactured by Hitachi High-Technologies Corporation (magnification: ×500) to check whether a porous material is formed. A sample in which a porous material was able to be observed was evaluated as "T" and a sample in which a porous material was not able to be observed was evaluated as "F".

TABLE 1

| Table 1 | | Example 1 | Example 2 | Example 3 | Example 4 | Comparative Example 1 |
|---|---|---|---|---|---|---|
| Solvent (B) | Type | DMIB | DMAA | DMIB | DMAA | GBL |
| | Dispersion term ($\delta D$) | 16.7 | 17.3 | 16.7 | 17.3 | 18.0 |
| | Polar term ($\delta P$) | 9.2 | 10.6 | 9.2 | 10.6 | 16.6 |
| | Hydrogen bond term ($\delta H$) | 6.5 | 8.0 | 6.5 | 8.0 | 7.4 |
| | Difference between (B-HSP) and (A-HSP) | 4.94 | 4.52 | 3.32 | 4.46 | 9.96 |
| | Difference between (B-HSP) and (W-HSP) | 36.52 | 34.91 | 36.52 | 34.91 | 35.26 |
| | Formation of porous material | T | T | T | T | F |

The abbreviations in "Table 1" mean the following.
"DMIB": N,N,2-trimethylpropionamide
"DMAA": N,N-dimethylacrylamide
"GBL": γ-butyrolactone As can be seen in FIG. 1, a porous material can be obtained without using DMF in the present invention.

On the other hand, in Comparative Example 1, which is an embodiment using γ-butyrolactone showing the difference between the Hansen solubility parameter of the solvent (B) (B-HSP) and the Hansen solubility parameter of the urethane resin (A) (A-HSP) out of the ranges defined in the present invention, the sample gelled and was not able to be dissolved in the urethane resin (A), thereby failing to produce a porous material.

The invention claimed is:

1. A method for producing a porous material, the method comprising processing a urethane resin composition comprising a urethane resin (A) and a solvent (B) by a wet film forming process,
the solvent (B) satisfying the following conditions:
a difference between a Hansen solubility parameter of the solvent (B) (B-HSP) and a Hansen solubility parameter of the urethane resin (A) (A-HSP) is in the range of 3 to 8 $(J/cm^3)^{1/2}$ and
a difference between the Hansen solubility parameter of the solvent (B) (B-HSP) and a Hansen solubility parameter of water (W-HSP) is in the range of 31.5 to 38 $(J/cm^3)^{1/2}$.

2. The method for producing a porous material according to claim 1, wherein the Hansen solubility parameter of the solvent (B) has a dispersion term ($\delta D$) in the range of 15.5 to 21.0 $MPa^{0.5}$, a polar term ($\delta P$) in the range of 7.0 to 14.5 $MPa^{0.5}$, and a hydrogen bond term ($\delta H$) in the range of 4.5 to 11.0 $MPa^{0.5}$.

3. The method for producing a porous material according to claim 1, wherein the solvent (B) is N,N,2-trimethylpropionamide and/or N,N-dimethylacrylamide.

4. The method for producing a porous material according to claim 2, wherein the solvent (B) is N,N,2-trimethylpropionamide and/or N,N-dimethylacrylamide.

* * * * *